(12) United States Patent
Santiago et al.

(10) Patent No.: US 9,744,664 B1
(45) Date of Patent: Aug. 29, 2017

(54) EDGE PROTECTOR CLIP KIT

(71) Applicants: Jose Santiago, Kissimmee, FL (US); Agueda Santiago, Kissimmee, FL (US)

(72) Inventors: Jose Santiago, Kissimmee, FL (US); Agueda Santiago, Kissimmee, FL (US)

( * ) Notice: Subject to any disclaimer, the term of this patent is extended or adjusted under 35 U.S.C. 154(b) by 0 days.

(21) Appl. No.: 15/090,673

(22) Filed: Apr. 5, 2016

(51) Int. Cl.
| | |
|---|---|
| *B66C 1/00* | (2006.01) |
| *H01M 2/00* | (2006.01) |
| *B25J 1/04* | (2006.01) |
| *B60P 7/08* | (2006.01) |
| *A46B 15/00* | (2006.01) |
| *A46B 5/00* | (2006.01) |
| *A47L 13/11* | (2006.01) |
| *A47L 13/08* | (2006.01) |

(52) U.S. Cl.
CPC ............... *B25J 1/04* (2013.01); *A46B 5/0095* (2013.01); *A46B 15/00* (2013.01); *A47L 13/08* (2013.01); *A47L 13/11* (2013.01); *B60P 7/0823* (2013.01); *B60P 7/0869* (2013.01)

(58) Field of Classification Search
CPC ......... B25J 1/04; B60P 7/0823; B60P 7/0869; B60P 7/0853; B61D 45/003; A46B 15/00; A46B 5/0095; A47L 13/11; A47L 13/08
USPC .................. 294/209, 24; 410/97–99, 156
See application file for complete search history.

(56) References Cited

U.S. PATENT DOCUMENTS

| | | | |
|---|---|---|---|
| 3,469,878 A | 9/1969 | DeHaan | |
| 3,936,088 A * | 2/1976 | Williams | B25J 1/04 294/175 |
| D342,198 S * | 12/1993 | Zamarripa | D8/14 |
| 5,348,359 A | 9/1994 | Boozer | |
| 5,381,319 A | 1/1995 | Shiao | |
| D371,286 S | 7/1996 | Garcia | |
| 5,967,575 A * | 10/1999 | Blake | B63B 21/54 114/221 R |
| 6,213,672 B1 | 4/2001 | Varga | |
| 6,510,599 B2 * | 1/2003 | AmRhein | F16B 45/025 248/925 |
| 6,820,906 B1 | 11/2004 | McClendon | |
| 7,380,848 B2 * | 6/2008 | Petruzelli | E01H 5/02 294/53.5 |
| 7,393,031 B2 * | 7/2008 | Goulet | B60P 7/0853 294/210 |
| 7,900,985 B2 | 3/2011 | Goodfellow | |
| 8,376,430 B1 * | 2/2013 | Lee | B25J 1/04 294/175 |

(Continued)

FOREIGN PATENT DOCUMENTS

| | | |
|---|---|---|
| CA | 2648808 A1 | 10/2009 |
| CA | 2753232 A1 | 3/2013 |

*Primary Examiner* — Stephen Vu
(74) *Attorney, Agent, or Firm* — Kyle A. Fletcher, Esq.

(57) ABSTRACT

The edge protector clip kit is a device that is adapted to work with an edge protector that is placed on a top, edge of a load of cargo. The edge protector clip kit includes a telescoping pole that is manually grasped in order for a user to manipulate the edge protector. The edge protector clip kit includes a clip holder that is adapted to engage the edge protector from below, and which enables manipulation of the edge protector via the telescoping pole. The telescoping pole is affixed to the clip holder. The clip holder includes a pair of armatures that are adapted to engage opposing sides of a vertical portion of the edge protector. The clip holder also includes a light and on/off button.

14 Claims, 6 Drawing Sheets

(56) References Cited

U.S. PATENT DOCUMENTS 8,641,110 B1 * 2/2014 Perry .................. A47F 13/06
  294/209
8,915,685 B2 12/2014 Flores

* cited by examiner

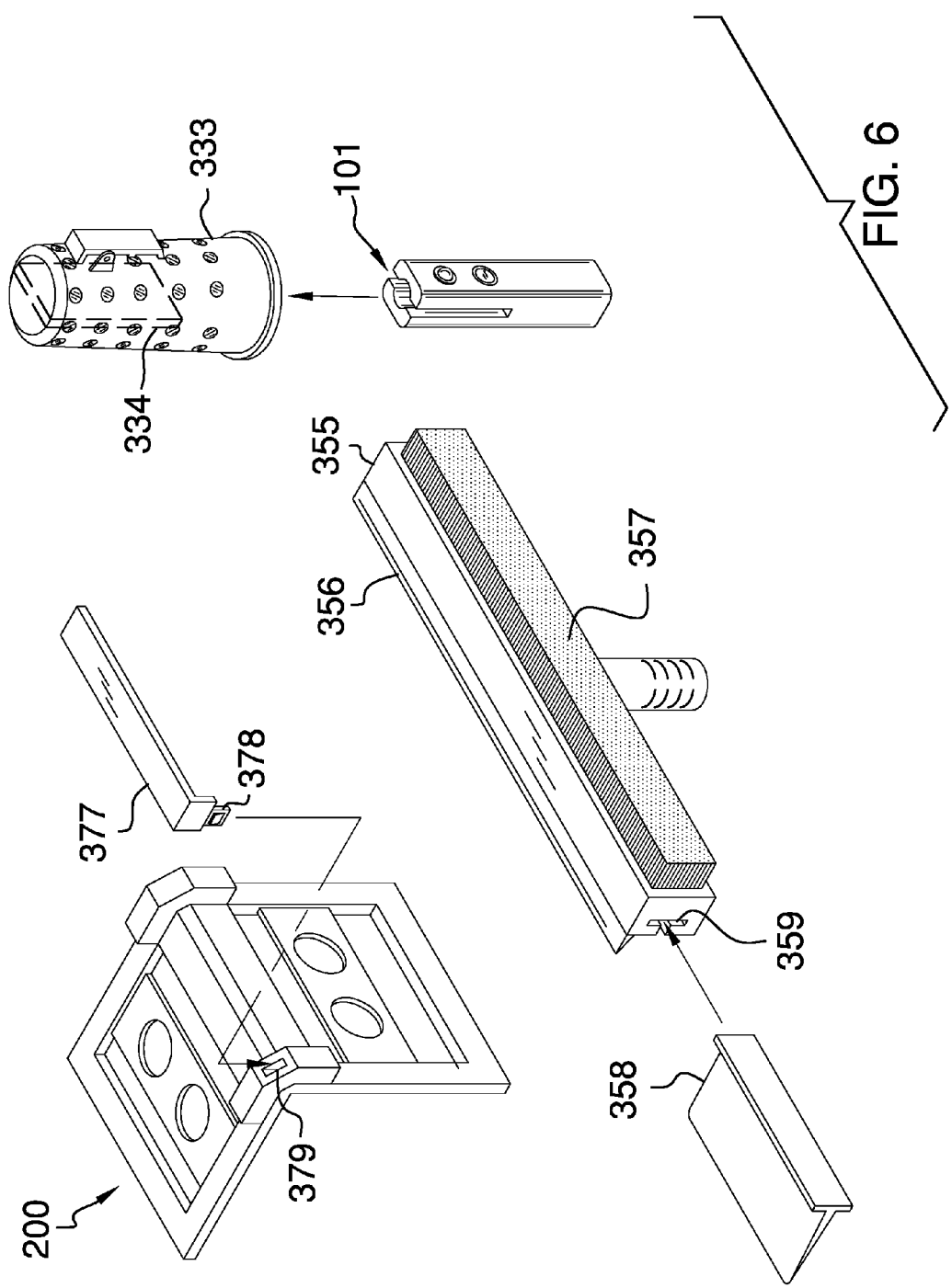

EDGE PROTECTOR CLIP KIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cargo hauling and loads, more specifically, a device that is used to aid in placing an edge protector atop of a load whereby the user is able to stand on the ground adjacent to the trailer and load, and thereby not needing to climb on top of the trailer and the load.

SUMMARY OF INVENTION

The edge protector clip kit is a device that is adapted to work with an edge protector that is placed on a top, edge of a load of cargo. The edge protector clip kit includes a telescoping pole that is manually grasped in order for a user to manipulate the edge protector. The edge protector clip kit includes a clip holder that is adapted to engage the edge protector from below, and which enables manipulation of the edge protector via the telescoping pole. The telescoping pole is affixed to the clip holder. The clip holder includes a pair of armatures that are adapted to engage opposing sides of a vertical portion of the edge protector. The clip holder also includes a light and on/off button.

It is an object of the invention to provide a kit that is adapted to aid in installing an edge protector on top, edges of a load and/or cargo on a trailer.

A further object of the invention is to provide a lighting capability to aid in manipulation of the edge protector in a poorly lit or unlit environment.

An even further object of the invention is to provide a telescoping handle to accommodate users and cargo of varying sizes.

These together with additional objects, features and advantages of the edge protector clip kit will be readily apparent to those of ordinary skill in the art upon reading the following detailed description of the presently preferred, but nonetheless illustrative, embodiments when taken in conjunction with the accompanying drawings.

In this respect, before explaining the current embodiments of the edge protector clip kit in detail, it is to be understood that the edge protector clip kit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the edge protector clip kit.

It is therefore important that the claims be regarded as including such equivalent construction insofar as they do not depart from the spirit and scope of the edge protector clip kit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 6 is a perspective view of accessories and an improved edge protector that collectively work with an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
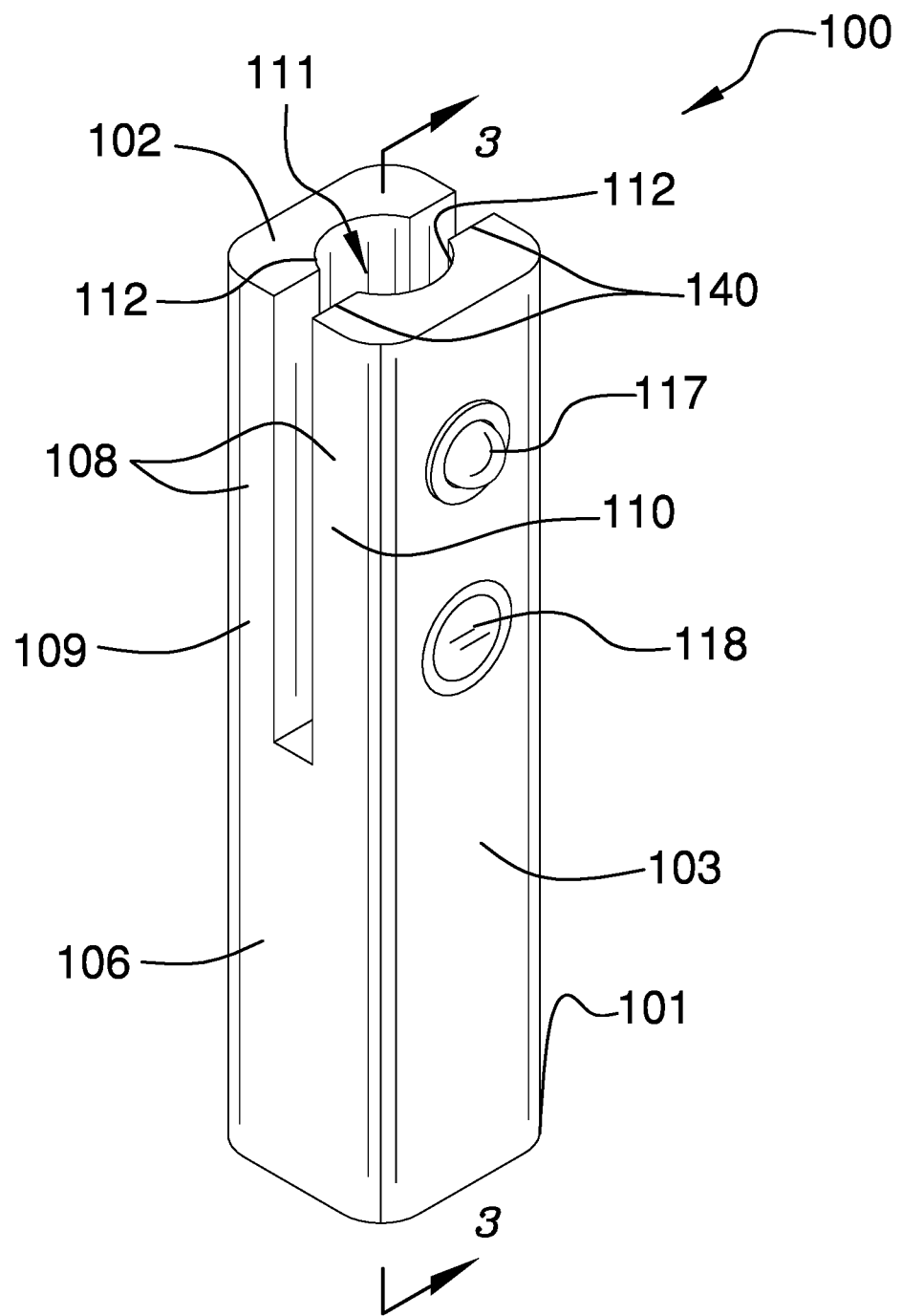
FIG. 1 is a front perspective view of an embodiment of the disclosure.
Figure 2:
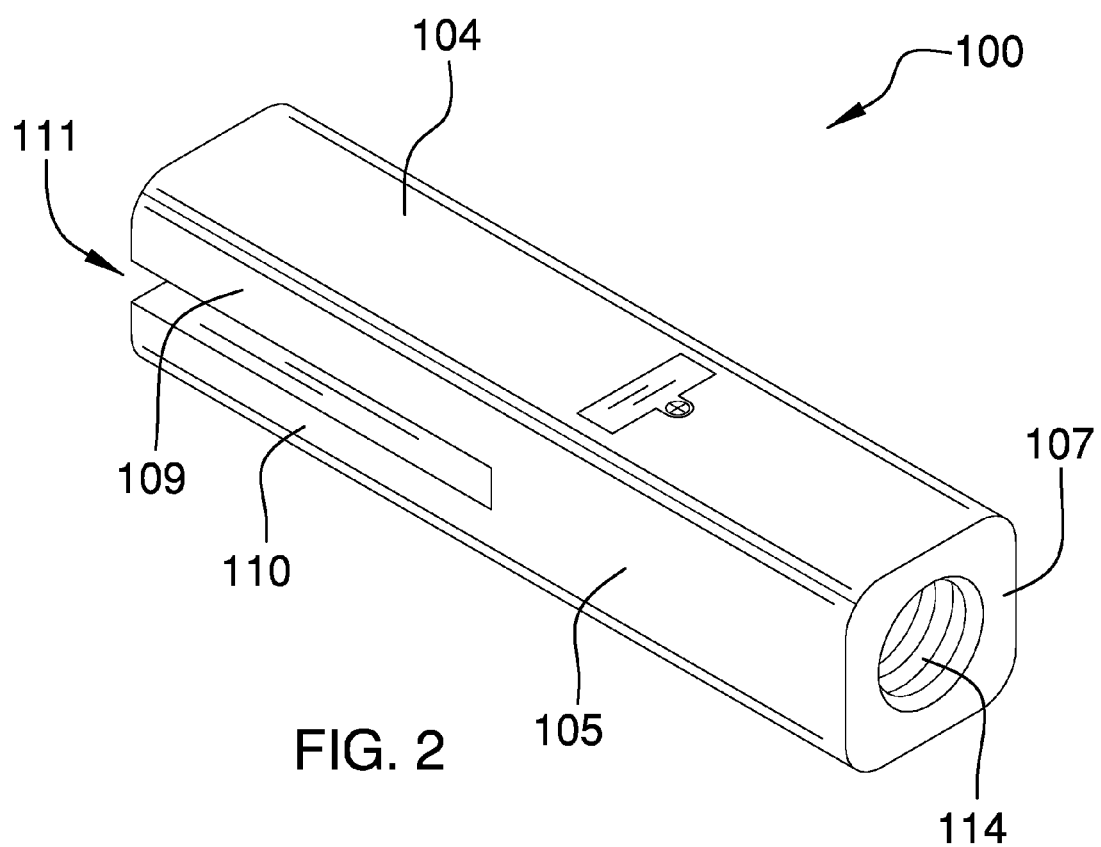
FIG. 2 is a side, perspective view of an embodiment of the disclosure.
Figure 3:
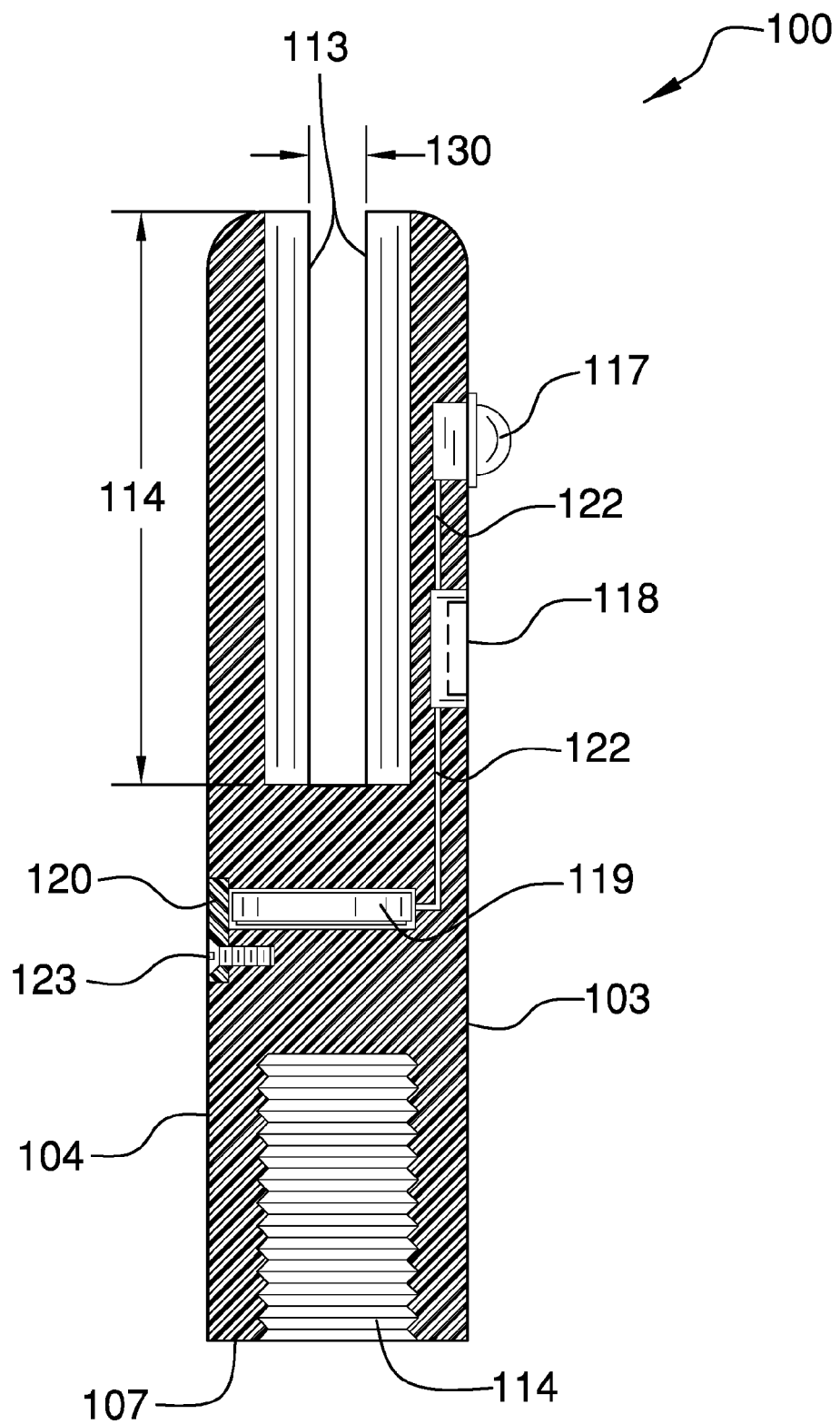
FIG. 3 is a cross-sectional view of an embodiment of the disclosure along line 3-3 in FIG. 1.
Figure 4:
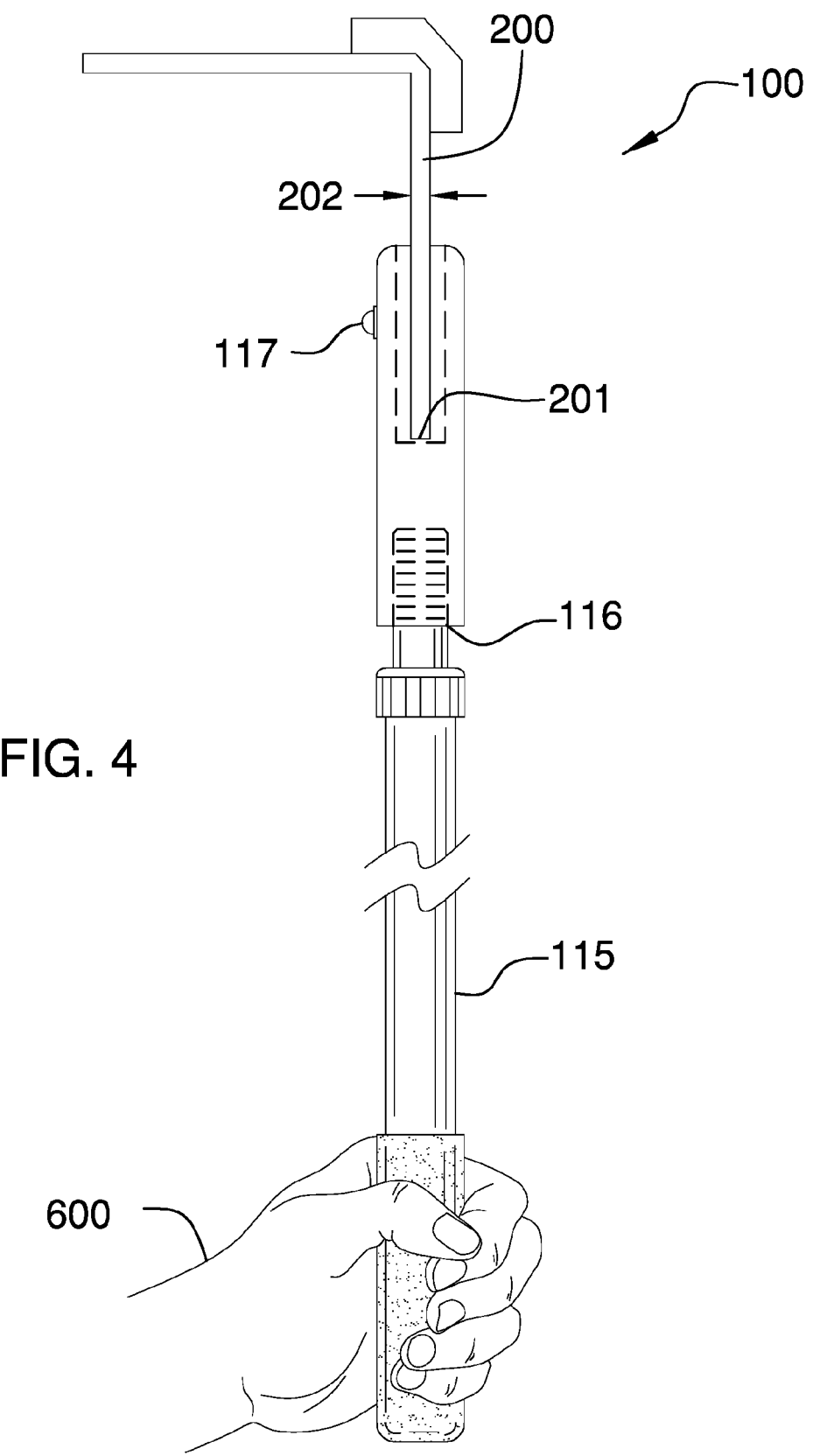
FIG. 4 is a side view of an embodiment of the disclosure.
Figure 5:
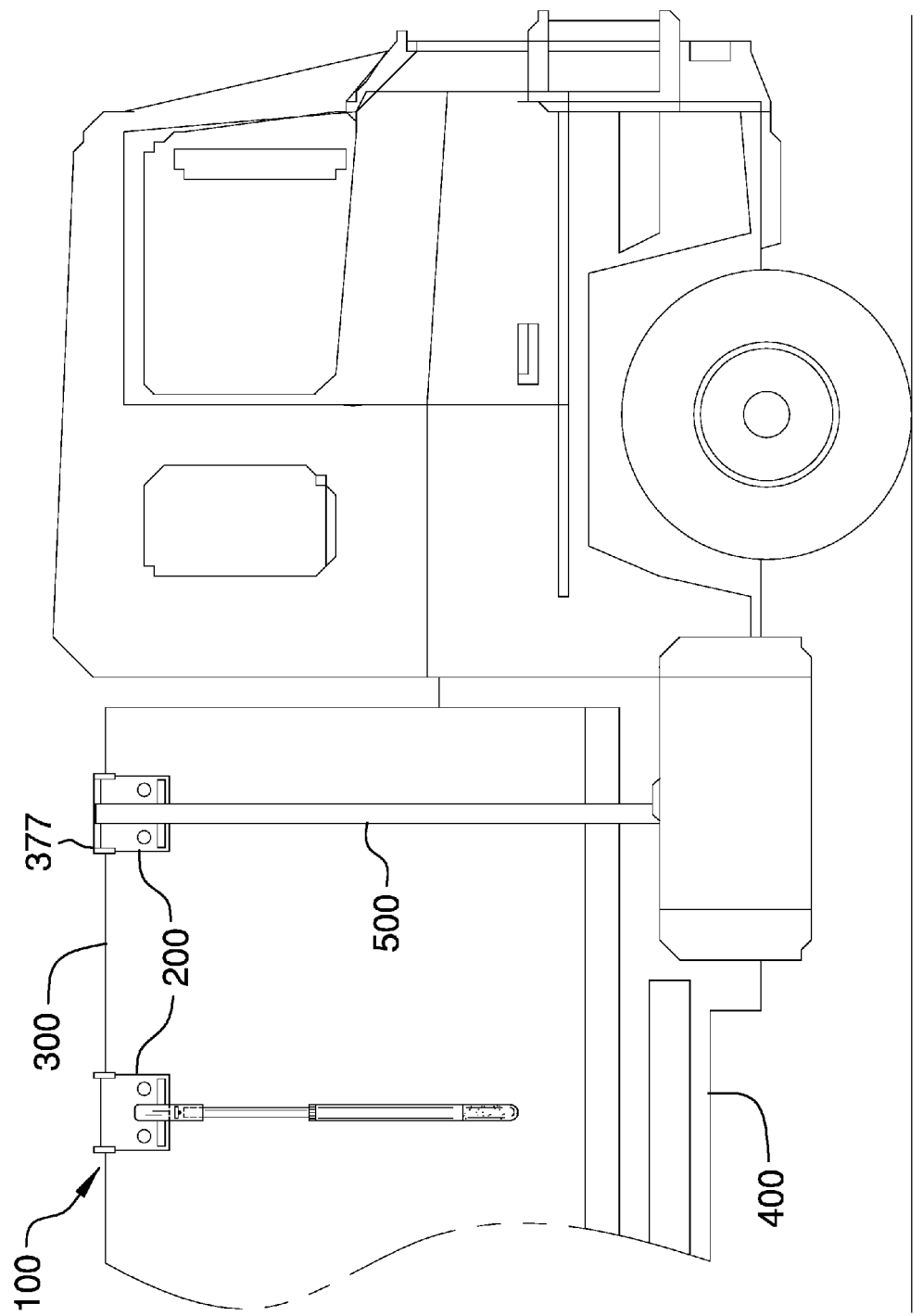
FIG. 5 is a view of an embodiment of the disclosure in use.

Detailed reference will now be made to a first potential embodiment of the disclosure, which is illustrated in FIGS. 1 through 6. The edge protector clip kit 100 (hereinafter invention) comprises an edge holder tool 101 that is further defined with a top surface 102, a front surface 103, a rear surface 104, a left surface 105, a right surface 106, and a bottom surface 107. The edge holder tool 101 is generally a rectangular block in shape, and further defined with a pair of holder armatures 108. The pair of holder armatures 108 is integrated into the overall shape of the edge holder tool 101.

The pair of holder armatures 108 is further defined with a first armature 109 and a second armature 110. The first armature 109 and the second armature 110 are generally parallel with one another, and separated via a slot 111. The slot 111 has a curvilinear edge 112 on opposing surfaces 113 of the first armature 109 and the second armature 110. The curvilinear edge 112 includes a concave portion 140 that is centrally located along the curvilinear edge 112 in order to increase the overall size of the slot 111. Moreover, the slot 111 extends a slot length 114 downwardly from the top surface 102 in order to define the pair of holder armatures 108.

The slot 111 enables the pair of holder armatures 108 to adaptively engage an edge protector 200. It shall be noted that the edge protector 200 is associated with hauling cargo 300 on a trailer 400. Moreover, the edge protector 200 is typically used with strapping 500 that secures the cargo 300 atop of the trailer 400. The edge protector 200 insures that the cargo 300 is not damaged via the strapping 500. The slot 111 is adapted to slide upwardly from a bottom protector edge 201 of the edge protector 200. The slot 111 may be further defined with a slot width 130, which is greater than an edge protector width 202 of the edge protector 200. Moreover, the edge holder tool 101 is adapted to manipulate the edge protector 200 with respect to the cargo 300 such that a user is not required to climb atop of the cargo 300 to install the edge protector 200.

The bottom surface 107 of the edge holder tool 101 includes a threaded hole 114. The threaded hole 114 enables a handle 115 to attach to the edge holder tool 101. The handle 115 may be telescoping in nature. Moreover, the handle 115 is of an undefined length, and is adapted to be grasped via a user 600. The handle 115 includes a threaded member 116 that is able to screw into the threaded hole 114 of the edge holder tool 101.

The edge holder tool 101 includes a light member 117 that is provided on the front surface 103. The light member 117 is wired to an on/off button 118. The on/off button 118 is wired to a power member 119. The power member 119 is ideally at least one battery that is stored within a compartment 120 integrated into the edge holder tool 101. The compartment 120 is accessible via a compartment door 121 that is provided on the rear surface 104 of the edge holder tool 101. The light member 117 is selectively used via the user 600 in order to illuminate the edge protector 200 and the cargo 300.

The on/off button 118 and the light member 117 are adjacent one another. Moreover, the on/off button 118 is located on the front surface 103. A wiring member 122 extends within the edge holder tool 101 in order to connect the light member 117 to the on/off button 118 as well as the on/off button 118 to the powering member 119. The compartment door 121 is secured over the compartment 120 via a fastener 123. The fastener 123 comprises the use of a screw, bolt, nail, rivet, or other fastening means currently available. The edge holder tool 101 and the handle 115 may be made of a myriad of materials comprising plastic, metal, wood, or a carbon fiber composite.

Referring to FIG. 6, the invention 100 may also include an emergency reflector 333 that slides over top of the edge holder tool 101. The emergency reflector 333 is a cup-shaped object that is able to slide onto the edge holder tool 101. A support bracket 334 is provided inside of the emergency reflector 333 in order to secure the emergency reflector 333 onto the edge holder tool 101.

FIG. 6 also depicts a cleaning accessory 355 that is included with the invention 100. The cleaning accessory 355 is generally elongated, and includes a squeegee 356, a brush 357, and an optional ice scraper 358. The optional ice scraper 358 slides onto the cleaning accessory 355 via a slotted groove 359 provided thereon.

The edge protector 200 of FIG. 6 may include a detachable strap 377. The detachable strap 377 includes a strap bracket 378 that clips into a bracket receptacle 379 provided on the edge protector 200. The strapping 500 is secured to the edge protector 200. Moreover, the strapping 500 is sandwiched between the edge protector 200 and the detachable strap 377.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventors claim:

1. An edge protector clip kit comprising an edge holder tool that engages an edge protector;
    wherein the edge holder tool manipulates the edge protector and which is adapted for use with cargo prior to installing webbing that secures the cargo onto a trailer;
    wherein the edge holder tool is further defined with a top surface, a front surface, a rear surface, a left surface, a right surface, and a bottom surface;
    wherein the edge holder tool is generally a rectangular block in shape, and further defined with a pair of holder armatures;
    wherein the pair of holder armatures is integrated into the overall shape of the edge holder tool;
    wherein the pair of holder armatures is further defined with a first armature and a second armature;
    wherein the first armature and the second armature are generally parallel with one another, and separated via a slot;
    wherein the slot has a curvilinear edge on opposing surfaces of the first armature and the second armature.

2. The edge protector clip kit according to claim 1 wherein the curvilinear edge includes a concave portion that is centrally located along the curvilinear edge in order to increase the overall size of the slot.

3. The edge protector clip kit according to claim 2 wherein the slot extends a slot length downwardly from the top surface of the edge holder tool in order to define the pair of holder armatures; wherein the slot enables the pair of holder armatures to engage the edge protector.

4. The edge protector clip kit according to claim 3 wherein the slot is adapted to slide upwardly from a bottom protector edge of the edge protector.

5. The edge protector clip kit according to claim 4 wherein the slot is further defined with a slot width, which is greater than an edge protector width of the edge protector; wherein the edge holder tool manipulates the edge protector with respect to the cargo such that a user is not required to climb atop of the cargo to install the edge protector directly.

6. The edge protector clip kit according to claim 5 wherein the bottom surface of the edge holder tool includes a threaded hole; wherein the threaded hole enables a handle to attach to the edge holder tool; wherein the handle is adapted to be grasped via said user.

7. The edge protector clip kit according to claim 6 wherein the handle includes a threaded member that is able to screw into the threaded hole of the edge holder tool.

8. The edge protector clip kit according to claim 7 wherein the edge holder tool includes a light member that is provided on the front surface; wherein the light member is wired to an on/off button; wherein the on/off button is wired to a power member.

9. The edge protector clip kit according to claim 8 wherein the power member stored within a compartment integrated into the edge holder tool; wherein the compartment is accessible via a compartment door that is provided on the rear surface of the edge holder tool; wherein the light member is selectively used in order to illuminate the edge protector as well as the cargo.

10. The edge protector clip kit according to claim 9 wherein the on/off button and the light member are adjacent one another; wherein the on/off button is located on the front surface; wherein a wiring member extends within the edge holder tool in order to connect the light member to the on/off button as well as the on/off button to the powering member.

11. The edge protector clip kit according to claim 10 wherein the compartment door is secured over the compartment via a fastener.

12. The edge protector clip kit according to claim 11 wherein an emergency reflector is included and slides over top of the edge holder tool; wherein the emergency reflector is a cup-shaped object that is able to slide onto the edge holder tool; wherein a support bracket is provided inside of the emergency reflector in order to secure the emergency reflector onto the edge holder tool; wherein the emergency reflector is able to be waved around in order to attract attention in an emergency situation.

13. The edge protector clip kit according to claim 12 wherein a cleaning accessory is included and is attachable to the handle in lieu of the edge holder tool; wherein the cleaning accessory is generally elongated, and includes a squeegee, a brush, and an optional ice scraper; wherein the optional ice scraper slides onto the cleaning accessory via a slotted groove provided thereon.

14. The edge protector clip kit according to claim 13 wherein the edge protector include a detachable strap; wherein the detachable strap includes a strap bracket that clips into a bracket receptacle provided on the edge protector; wherein the strapping is adapted to be secured to the edge protector; wherein the strapping is adapted to be sandwiched between the edge protector and the detachable strap.

* * * * *